United States Patent
Lee et al.

(10) Patent No.: US 8,654,977 B2
(45) Date of Patent: *Feb. 18, 2014

(54) SYSTEM AND METHOD FOR CONTROLLING ACCESS BETWEEN BLUETOOTH DEVICES

(75) Inventors: Reo Lee, Mississauga (CA); Eil Beron Meghdies Vardeh, Mississauga (CA)

(73) Assignee: Psion Inc., Mississauga (CA)

( * ) Notice: Subject to any disclaimer, the term of this patent is extended or adjusted under 35 U.S.C. 154(b) by 211 days.

This patent is subject to a terminal disclaimer.

(21) Appl. No.: 12/954,650

(22) Filed: Nov. 25, 2010

(65) Prior Publication Data
US 2012/0137346 A1    May 31, 2012

(51) Int. Cl.
*H04K 1/00* (2006.01)
*G06F 21/00* (2013.01)
*G06F 7/04* (2006.01)

(52) U.S. Cl.
USPC ...... 380/270; 726/2; 726/4; 726/29; 713/183; 713/184

(58) Field of Classification Search
USPC .............. 726/4, 2, 29; 380/270; 713/183, 184
See application file for complete search history.

(56) References Cited

U.S. PATENT DOCUMENTS

| | | | |
|---|---|---|---|
| 7,844,307 B2 | 11/2010 | Henson et al. | |
| 8,112,794 B2 | 2/2012 | Little et al. | |
| 8,364,088 B2 | 1/2013 | Pattenden et al. | |
| 2002/0110123 A1* | 8/2002 | Shitama | 370/389 |
| 2006/0105746 A1* | 5/2006 | Pirila et al. | 455/411 |
| 2008/0225813 A1* | 9/2008 | Selgert | 370/338 |
| 2008/0301779 A1 | 12/2008 | Garg et al. | |
| 2009/0217353 A1* | 8/2009 | Zheng | 726/3 |
| 2011/0093913 A1* | 4/2011 | Wohlert et al. | 726/1 |
| 2012/0052793 A1 | 3/2012 | Brisebois et al. | |
| 2012/0135683 A1 | 5/2012 | Lee et al. | |

FOREIGN PATENT DOCUMENTS

| | | |
|---|---|---|
| EP | 1868343 A1 | 12/2007 |
| GB | 2439364 A | 12/2007 |

OTHER PUBLICATIONS

Non Final Office Action mailed Jan. 2, 2013 in related U.S. Appl. No. 12/954,653, Reo Lee, filed Nov. 25, 2010.

(Continued)

*Primary Examiner* — Mohammad W Reza

(57) ABSTRACT

A method and system is provided for using an access list stored on a memory of a first computing device, the access list for controlling communication between the first computing device and a plurality of computing devices in a Bluetooth communication network. The method comprises: initiating a restricted mode of operation on the first computing device, the restricted mode of operation configured to secure the access list to prevent subsequent unauthorized modification thereon, the access list including at least one entry representing at least one selected computing device of the plurality of computing devices being permitted to access the first computing device, the at least one entry comprising at least one identifier to identify the at least one selected computing device; in response to a connection request between the first computing device and a particular computing device of the plurality of computing devices, determining whether the particular computing device is on the access list; and preventing connection between the first computing device to the particular computing device in response to determining that the particular computing device is not on the access list.

20 Claims, 14 Drawing Sheets

(56) References Cited

OTHER PUBLICATIONS

"Specification of the Bluetooth System, Specification vol. 6", Jun. 30, 2010, pp. 2165-2300, XP55016390, Retrieved from the Internet: URL:http://developer.bluetooth.org/KnowledgeCenter/TechnologyOverview/Documents/CoreSPEC.pdf retrieved on Jan. 12, 2012] * vol. 6, Section 4.3 *.

Corresponding European Patent Application No. 11183449.5 Search Report dated Jun. 8, 2012.

Final Office Action mailed Jul. 12, 2013 in U.S. Appl. No. 12/954,653, Reo Lee, filed Nov. 25, 2010.

* cited by examiner

SYSTEM AND METHOD FOR CONTROLLING ACCESS BETWEEN BLUETOOTH DEVICES

FIELD

The present invention relates generally to Bluetooth™ enabled computing devices and specifically, to a system and method for controlling communication access between such devices.

BACKGROUND

As is known in the art, Bluetooth is a wireless technology that allows short range communications between Bluetooth enabled computing devices. Bluetooth enabled computing devices can include portable and/or fixed computing devices.

Accordingly, Bluetooth provides short range radio communications between computing devices located within a predefined physical range. Typically, the short range of Bluetooth technology is application specific and can be pre-defined. Bluetooth operates in the 2.4 GHz ISM radio frequency band. Typically, Bluetooth computing devices operate in a master-slave configuration such that a master Bluetooth computing device can communicate with a number of slave computing devices (i.e. within a piconet or Bluetooth communication network of devices). In turn each of the slave computing devices can act as a master within a separate piconet and connect to a number of designated devices.

Conventionally, Bluetooth security measures have been limited to a few main modes of security. In one mode, no authentication means is defined for the computing device such that anyone can access the device. In another mode, a user can switch the Bluetooth connection mode to "non-discoverable" and avoid being discovered by other Bluetooth computing devices entirely. In this mode, the device could also be set such that the non-discoverable mode occurs for a predefined period of time. In yet another mode, users of different Bluetooth computing devices may need to authenticate by exchanging a password or PIN number between one another after which a connection can be established.

However, all these types of security are limited in their capabilities and in some cases could still allow unwanted connections to be made. Also, it may not be desirable for a computing device to define themselves as non-discoverable as this would limit the connections that occur subsequently. Accordingly, it would be advantageous to provide an improved method of controlling access between a computing device and other computing devices in a Bluetooth communication network.

Accordingly, it is desirable to provide a solution that obviates or mitigates at least some of the above mentioned disadvantages.

SUMMARY

In accordance with one aspect of the present invention there is provided a system and method for using an access list stored on a memory of a first computing device, the access list for controlling communication between the first computing device and a plurality of computing devices in a Bluetooth communication network, the method comprising: initiating a restricted mode of operation on the first computing device, the restricted mode of operation configured to secure the access list to prevent subsequent unauthorized modification thereon, the access list including at least one entry representing at least one selected computing device of the plurality of computing devices being permitted to access the first computing device, the at least one entry comprising at least one identifier to identify the at least one selected computing device; in response to a connection request between the first computing device and a particular computing device of the plurality of computing devices, determining whether the particular computing device is on the access list; and preventing connection between the first computing device to the particular computing device in response to determining that the particular computing device is not on the access list.

In one aspect, the method further comprises preventing subsequent discovery requests from the first computing device in response to initiating the restricted mode of operation. In another aspect, the at least one identifier is selected from the group consisting of: IP address, MAC address, serial number, and Bluetooth address.

In accordance with another aspect of the present invention there is provided a system and method of configuring an access list on a first computing device for defining communication between the first computing device and a plurality of computing devices in a Bluetooth communication local network, the method comprising: generating a discovery request at the first computing device, the discovery request targeted to the plurality of computing devices and configured to generate a list of discovered devices for communication; and identifying at the first computing device, via a user interface, at least one selected computing device from the discovered devices being permitted to access the first computing device, the at least one selected computing device being defined with at least one device identifier to identify each of the at least one selected computing device in the access list, the access list for subsequent use in preventing access between the first computing device and each computing device not on the access list.

In one aspect, the device identifier is selected from the group consisting of: Bluetooth address, IP address device, MAC address of the device, serial number of the device, and a pre-defined device name. In another aspect, the method comprises locking the access list to restrict subsequent modification on the first computing device. In yet another aspect, locking the access list is configured to further prevent a subsequent discovery request at the first computing device.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

In view of the limitations of existing Bluetooth communication systems, it would be advantageous to provide for configuration of an access list (also referred to as a restricted device list herein) which, when installed on a computing device, controls access between the computing device and other computing devices accessible to it via a Bluetooth communication network. The controlled access is used to specifically restrict which computing devices within the Bluetooth communication network are allowed to connect to the computing device (as well as which other computing devices the computing device is allowed to connect to). Based on the pre-defined access list, controlled communication occurs between the computing device and other Bluetooth computing devices defined in the access list.

As used herein, the term "computing device" is intended to include a wide range of digital devices including, without limitation, devices which generate digital information, such as computer terminals, RFID readers, Bar Code Scanners, etc. and devices which use digital information, such as printers. Accordingly, computing devices can include fixed and/or portable devices and/or embedded devices such as mobile computers, mobile phones, digital cameras, scanners, printers, GPS receivers, phone headsets, one-chip Bluetooth devices, and embedded electronics (e.g. Bluetooth phones embedded with cars) and any other electronic devices as will be envisaged by a person skilled in the art which support Bluetooth wireless communications.

Figure 1:
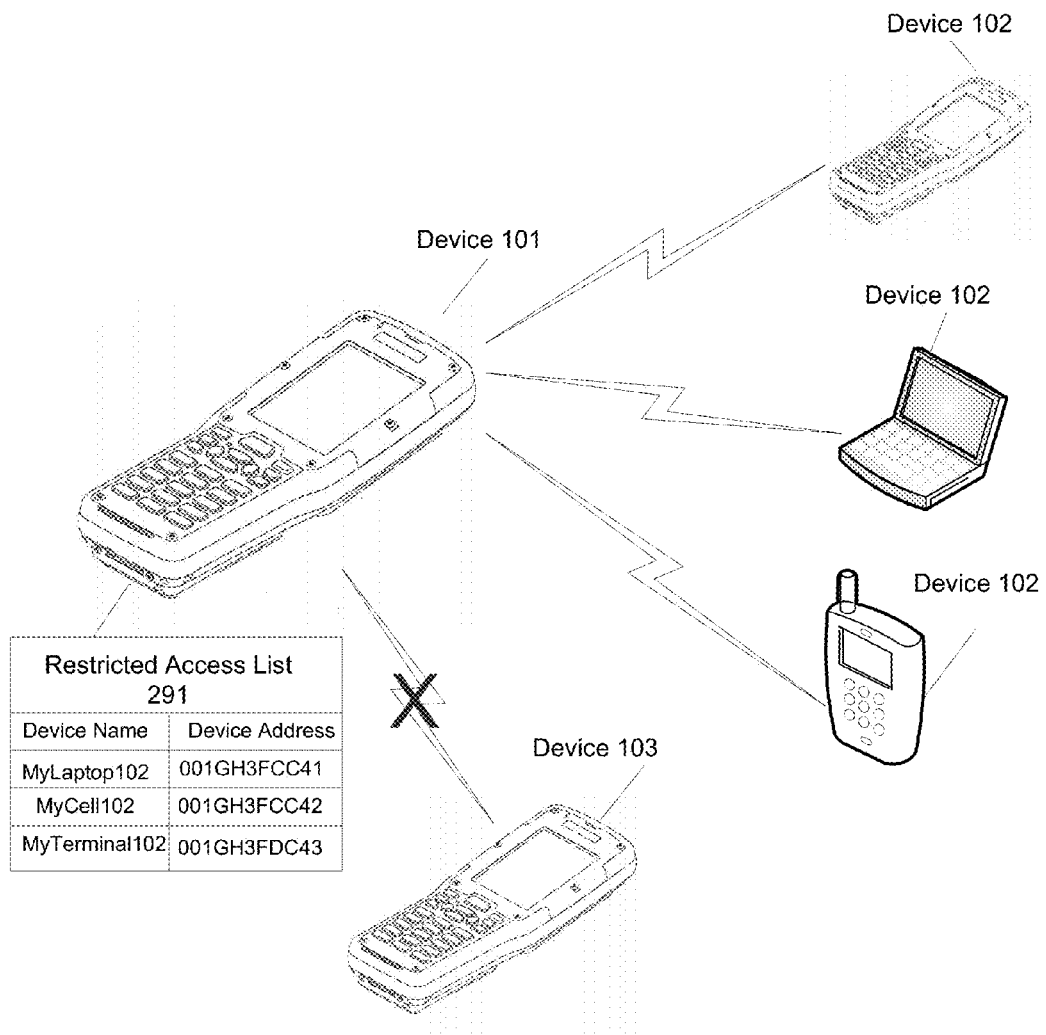
FIG. 1 illustrates an example of a Bluetooth communication network with a first computing device configured according to controlled access between the first computing device and a plurality of other computing devices in accordance with the present invention.

Referring now more particularly to the accompanying figures, FIG. 1 depicts an example of a peer to peer Bluetooth communication network in accordance with one embodiment of the present invention. In the embodiment depicted in FIG. 1, computing device 101 is the master or computing device (also referred to as the first computing device) which contains an access list 291 stored in a memory 290 of the computing device 101. In one embodiment, computing device 101 discovers and manages connection information in access list 291 from a plurality of devices within a given locality.

According to one embodiment, computing device 101 may be pre-loaded with access list 291 that is previously defined by an external device (e.g. a second computing device) or access list 291 may be generated locally on computing device 101. In the case where access list 291 is locally generated, the following steps occur between computing device 101 and the plurality of devices accessible to it via the Bluetooth communication network. That is, computing device 101 is configured for discovering a list of devices available for communication (e.g. devices 102 and 103). Referring to FIG. 1, it is noted that devices 101, 102, and 103 are considered to be Bluetooth enabled devices. Computing device 101 may communicate with the plurality of devices 102, 103 using different communication schemes such as secure or non-secure Bluetooth and other communication protocols designed to work in a Bluetooth communication network. In response to remotely discovering the list of devices available for communication, a selected number of computing devices are defined in access list 291 (e.g. devices 102). It is noted that in FIG. 1, for the sake of convenience a number of devices are denoted as 102 to indicate computing devices that are on access list 291 of computing device 101.

In one embodiment, the access list 291 is defined on a second or external computing device. In one aspect, the access list 291 can be defined on the second computing device by receiving user input providing at least one identifier to identify the at least one selected computing device for the at least one entry. That is, a user can be aware of the desired Bluetooth addresses that a particular computing device should be permitted to connect to and thus the access list 291 is created by manually inputting the desired device identifier(s). As is described herein, the at least one identifier is selected from the group consisting of: IP address, MAC address, serial number, and Bluetooth address. In one aspect, the second computing device is a non-Bluetooth device.

Accordingly, access list 291 provides a listing of a selected number of devices (e.g. 102) from the available communication devices (e.g. 102, 103) being permitted to access computing device 101 for subsequent communication therewith. As illustrated in FIG. 1, access list 291 further includes informational elements related to each device on the list. The informational elements also referred to as device identifiers can include for example one or more of the following: a Bluetooth address, a device name, a device address, a device type, a serial number, a device model number, and an IP address, etc. It will be noted that access list 291 contains entries for each of the devices permitted to access computing device 101. Accordingly, access list may be defined and/or as a list, a set, a vector, a single identifier (e.g. one or more Bluetooth addresses), or any other form for conveying the device identifiers as will be envisaged by a person skilled in the art.

As will be understood by a person skilled in the art, Bluetooth device addresses typically comprise a 48 bit address used to identify each Bluetooth enabled device and is usually denoted by "BD_ADDR" in technical specification. However, other types of Bluetooth device addresses as envisaged by a person skilled in the art can be used herein. In some cases, a pseudo-name or other device name representing the underlying Bluetooth address may be used as the device identifiers for access list 291.

The selected number of devices 102 allowed to access computing device 101 as defined in access list 291 on computing device 101 are also referred to as "safe" devices 102 herein. As illustrated in FIG. 1, one or more devices 103 may not be listed on the access list 291 of computing device 101 and thus as will be described below, will not be allowed to communicate with computing device 101 via the Bluetooth communication network. That is, a Bluetooth manager 300 of computing device 101 (see FIG. 2) will prevent connections between computing device 101 and device 103. As will also be described below, once computing device 101 enters a restricted access mode (such as to limit Bluetooth connections to those listed in access list 291), then existing connections to devices (e.g. 103) not listed on access list 291 of computing device 101 are dropped or otherwise terminated.

Computing devices 101, 102 and 103 may be fixed or portable systems configured to operate using Bluetooth communication and will be referred to variously and interchangeably as a handheld computing device, mobile computer, mobile terminal, a computing device or a device in the disclosure herein. Further, it is noted that the embodiment described in relation to FIG. 1 shows a memory 290 of computing device 101 storing access list 291 for the device, additional access lists may be provided and/or defined on devices 102 or 103. That is, permitting Bluetooth communication and connection between computing device 101 and 102 may be further be dependent on the presence of computing device 101 on one or more access lists defined on devices 102.

In one aspect, the restricted Bluetooth communication described herein for using access lists 291 for controlling communication between a first computing device (e.g. 101) and a plurality of other computing devices (e.g. 102, 103) that are Bluetooth enabled devices is further configured to operate in combination with existing Bluetooth security measures. For example, in one aspect, subsequent to determining the existence of a device 102 on access list 291 of computing device 101, password and other authorization measures are exchanged prior to allowing connection and communication between the devices (e.g. 101 and 102). That is, access list 291 provides a filtering mechanism for restricting Bluetooth communication for computing device 101 to those computing devices provided in the access list 291.

Figure 2:
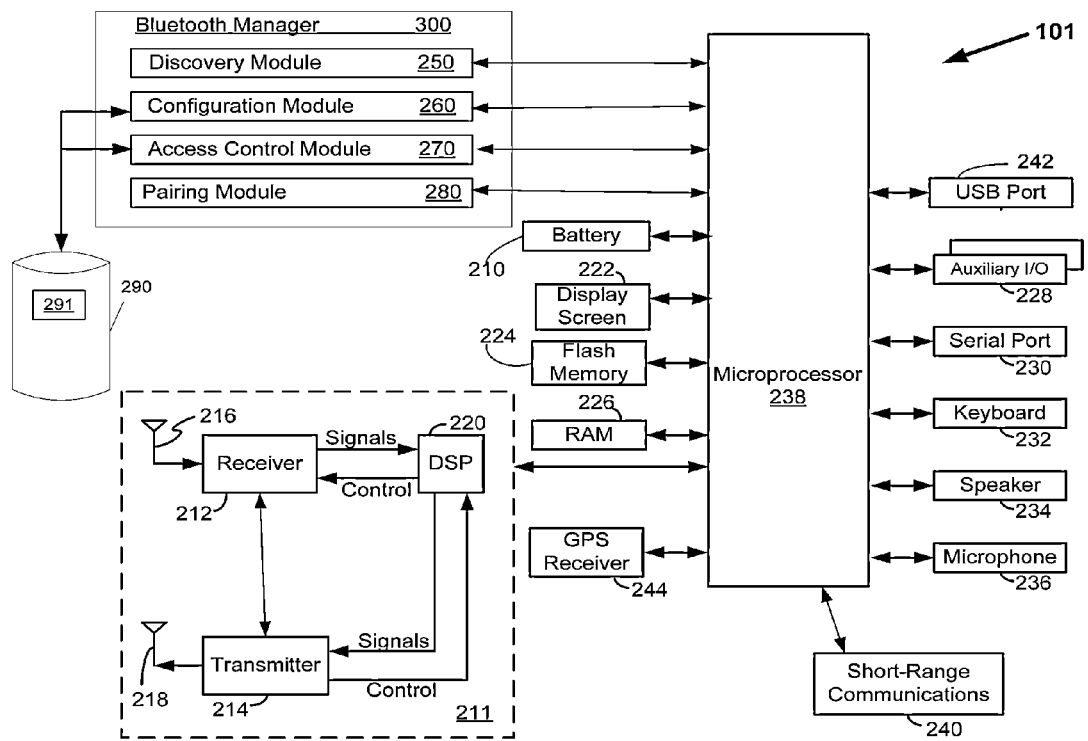
FIG. 2 is block diagram illustrating the functional subsystems of the first computing device of FIG. 1 including a discovery module, a configuration module, an access control module, and a pairing/connection module.

FIG. 2 illustrates an architecture of the functional subsystems of computing device 101 in accordance with one embodiment. Computing device 101, which may be a handheld device, can have the capability of communicating at least data, and possibly any of data, audio and voice communications, to and from devices as well as data acquisition sources within a communication network.

Computing device 101 may include wired or wireless communication capability. In the wireless configuration, the computing device 101 typically includes radio frequency (RF) communication subsystem 211, which includes a receiver 212, a transmitter 214, and associated components, such as one or more embedded or internal antenna elements 216 and 218, and a processing module such as a digital signal processor (DSP) 220. As will be apparent to those skilled in field of communications, the particular design of RF communication subsystem 211 depends on the specific communication network in which computing device 101 is intended to operate, but can include communication functionalities such as radio-frequency identification (RFID), Wi-Fi WLAN based on IEEE 802.11 standards, Zigbee, Z-Wave and the like.

Computing device 101 includes a microprocessor 238 which controls general operation of device 101. Microprocessor 238 also interacts with functional device subsystems, such as a screen display module 222, a flash memory 224, random access memory (RAM) 226, auxiliary input/output (I/O) subsystems 228, serial port 230, keyboard module 232, speaker 234, microphone 236, short-range communications subsystem 240, such as Bluetooth™ for example, and Universal Serial Bus (USB) expansion port 242 for peripherals. Computing device 101 may include a power source such as battery module 210 which may also be removable and replaceable from computing device 101. Computing device 101 may also include a positioning device 244, such as a GPS receiver for example, for receiving positioning information.

Still with regard to FIG. 2, operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on computing device 101. A predetermined set of applications, which control basic device operations, or even more customized, advanced device operations, may be installed on computing device 101 during its manufacture, such as during the components configuration process described herein. These operations typically include data and voice communication applications, for example. As described herein, access list 291 may be defined locally on computing device 101, loaded from another computing device or a combination thereof. Accordingly, applications and/or access lists 291 may also be subsequently loaded onto computing device 101 through communication subsystem 211, auxiliary I/O subsystem 228, serial port 230, USB port 242, short-range communications subsystems 240, or any other suitable subsystem, and installed by a user in RAM 226, or persistent store 224, for execution by microprocessor 238. Such flexibility in application installation increases the functionality of computing device 101 and may provide enhanced on-device features, communication-related features, or both.

As will be apparent to those skilled in field of communications, the particular design of communication subsystem 211 depends on the communication network in which computing device 101 is intended to operate, and may include various communication functionalities as will be understood by a person skilled in the art.

Display screen module 222 of computing device 101 may be used to visually present a software application's graphical user interface (GUI) to a user via a display screen. As will be described in relation to example screen shots shown in FIGS. 5A-5G and 6A-6C, the GUI may be used to display results provided by a discovery module 250, modifications made by a configuration module 260, pairing connections made via a pairing module 280 and restrictions provided by an access control module 270 of a Bluetooth manager 300 and each of these modules is discussed below in more detail. In one aspect, access control module 270 operates independently of Bluetooth manager 300 and is configured to control communication between devices in the Bluetooth communication network. In another aspect, the access control module 270 can be a separate entity (e.g. either in software and/or hardware) which controls communication access between Bluetooth devices and is configured to communicate with the Bluetooth manager 300.

Display screen module 222 may employ a touch screen display, in which case the user can manipulate application data by modifying information on the GUI using direct touches by a finger or stylus. Depending on the type of computing device 101, the user may have access to other types of input devices, such as, for example, buttons, a scroll wheel, trackball or light pen or any other input devices as will be envisaged by a person skilled in the art.

A graphical user interface presented at display screen module 222 of computing device 101 may enable an operator or administrator to interact therewith. For example, an administrator can manage the processes of having computing device 101 being capable of one or more of the following functionalities, including: identification as a computing device using a parameter setting, initiating discovery, configuring and/or downloading restricted access list(s) 291, restricting communication with other devices using one or more access lists 291 stored on memory 290, establishing communication with other devices in the Bluetooth communication network, and selecting the configuration of components and data to be downloaded from computing device 101 to one or more of other computing devices 102. It further contemplated that computing device 101 may be communicatively coupled to a remotely located database (not shown).

As illustrated in FIG. 2, and as mentioned above, computing device 101 comprises a Bluetooth manager 300 for facilitating Bluetooth restricted mode operation between computing device 101 and the plurality of computing devices (e.g.

102, 103) located in a Bluetooth communication network. Bluetooth manager 300 further comprises a discovery module 250, a configuration module 260, an access control module 270 (for interacting with a storage 290 including one or more access lists 291) and a pairing/connection module 290.

Discovery module 250 of computing device 101 can comprise any combination of software, firmware and hardware for implementing a discovery mechanism for discovering new devices present within Bluetooth communication network. In one aspect, discovery module 250 can also allow a limited initial exchange of information between computing device 101 and new devices within Bluetooth communication network. Accordingly, discovery module 250 is configured for generating a discovery request at the first computing device (e.g. computing device 101) such that the discovery request is targeted to a plurality of computing devices (e.g. 102, 103 and other Bluetooth enabled computing devices accessible to device 101) to generate a list of discovered devices available for communication (e.g. 102 and 103). It is further contemplated that discovery module 250 may be used to provide an update mechanism for updating the list of discovered computing devices (e.g. 102 and 103).

The discovery requests may be multi-cast or broadcasted, or any variation thereof. It is contemplated that the specific implementation of IP addressing for discovery may be made taking into account the network management considerations, such as security and bandwidth concerns, of the network administrator or the relevant network administration policy. A discovery request may be sent out periodically, until terminated at computing device 101. As discussed herein, in one embodiment, once the computing device 101 enters a restricted mode operation (which entry can be effected manually, semi-automatically, and/or automatically), Bluetooth manager 300 (e.g. via access control module 270) is configured to prevent the discovery module 250 from generating subsequent discovery requests until the Bluetooth restricted mode of operation no longer exists.

In one embodiment, an update discovery request initiated at discovery module 250 may be sent out periodically until terminated at computing device 101, or until all the targeted computing devices take an action in response to the discovery request. Computing device 101 can be capable of identifying itself to other computing devices 102, prior to sending out the discovery request.

Configuration module 260 of computing device 101 can comprise any combination of software, firmware and hardware for storing various configuration files, or software components, and other related configuration information. However, it is also contemplated that the configuration files, one or more access lists 291, software components and other related configuration information can be stored in specific memory 224, 226, 290 locations of computing device 101. Configuration module 260 is configured to facilitate defining one or more devices listed in access list 291. In one aspect, configuration module 260 interacts with discovery module 250 and with a user interface of computing device 101 such as to allow selection of a desired number of devices from the available devices for being included in access list 291.

As discussed above, discovery module 250 generates the listing of the available devices for communication. The listing of available devices (e.g. device 102 and 103) provided by discovery module 250 is also referred to herein as discovered devices. In one embodiment, the user interface of computing device 101 is used to facilitate selection of the devices permitted to access first computing device 101 from the discovered devices (e.g. 102, 103).

In one example, an administrator defines access list 291 on first computing device 101. As described earlier, access list 291 contains a listing of a selected number of devices (e.g. 102) permitted to access first computing device 101. Access list 291 may be defined either manually, or automatically (i.e. a listing of pre-defined discovered devices obtained via discovery module 250 at a particular time may be stored in access list 291) or semi-automatically (i.e. according to pre-defined criteria for filtering the listing of discovered devices). In one aspect, the administrator may want to select certain selected computing devices (e.g. 102) for placement within access list 291 from the list of discovered devices provided by discovery module 250. In another aspect, access list 291 for computing device 101 may be partially and/or fully provided from a previous selection of permitted devices performed on a different device (e.g. device 102). In yet another aspect, configuration module 260 may be used to define a filter which filters the listing of discovered devices (e.g. 102 and 103) provided from discovery module 250 according to pre-defined criteria. The pre-defined criteria can include, for example, a commonality of device addresses, services provided, serial numbers, type of devices, or device names between the discovered devices. The pre-defined criteria can also include other informational element identifiers for the devices as will be apparent to those of skill in the art.

In one embodiment, once access list 291 is defined and/or loaded on computing device 101, a restricted mode of operation may be initiated on first computing device 101 via configuration module 260. The restricted mode of operation is configured to secure access list 291 such as to prevent subsequent unauthorized access thereto. In one aspect, the administrator may request initiating restricted access mode of operation on first computing device 101 via the user interface of Bluetooth manager 300. Additionally, the restricted access mode of operation is configured to prevent any subsequent discovery requests on first computing device 101.

For example, once the administrator has activated a restricted mode of operation for a computing device, the administrator can limit authorization for accessing the restricted mode of operation (and exiting the restricted mode) via a password or other verification means. Accordingly, in the present example, it may not be desirable to generate a listing of discovered devices on display screen 222 of computing device 101 if the user of computing device 101 is unable to make modifications to access list 291 or establish connections with other devices not defined in access list 291 due to their limited authorization. In such a case, this allows administrator(s) to have control over their computing devices such as to specifically control Bluetooth communications between first computing device 101 and other computing devices such that once access lists 291 are defined on the computing device (e.g. computing device 101), they can not be altered, modified or discarded without pre-defined authorization (e.g. by the administrators).

As described herein, once access list 291 is defined on one computing device (e.g. computing device 101) it may be installed, downloaded or otherwise transferred to another computing device (e.g. one of devices 102). Typically, access list 291 is copied along with the password or authorization means associated with access list 291. In this way, an administrator can minimize the amount of time spent for generating access list 291 on different computing devices. Once copied onto another computing device (e.g. 102), access list 291 can subsequently be modified and added to with pre-defined authorization.

The configuration files, access lists 291, software components and other related configuration or provisioning information, whether stored in configuration module 260 or other memory 224, 226, 290 locations, may be specially designated and earmarked as sharable information within computing device 101. As discussed herein, access lists 291 may be password protected and/or otherwise encrypted such as to prevent unauthorized modification when copying or sharing with other devices. Additionally, a password or other verification mechanisms may be needed to allow sharing of access list 291.

Other configuration information provided in configuration module 260 can include, for example, configuration information related to the associated groups of computing devices that are able to access (and receive) access list 291 defined and managed by computing device 101. The configuration information can also include components and data for respective configurations of corresponding access lists of computing devices 102, including for example configuration updates.

Referring again to FIG. 2, Bluetooth manager 300 further comprises an access control module 270 which may comprise any combination of software, firmware and hardware. Access control module 270 is configured for restricting connection between first computing device 101 and a particular computing device (of the plurality of computing devices 102, 103) based on the existence of the particular computing device on access list 291. For example, as described in relation to FIG. 1, access control module 270 will not permit connection between first computing device 101 and computing device 103 as computing device 103 is not located on access list 291 during the restricted mode operation. As described herein, access control module 270 monitors connections when computing device 101 is operating in the restricted mode operation as defined by configuration module 260. Additionally, if a connection and/or pairing is made to an unsafe device (e.g. device 103) prior to entering the restricted mode of operation, access control module 270 is configured to drop the connection to the unsafe device (not listed on access list 291) upon entering the restricted mode of operation.

Additionally, as described above, the connection and communication between computing device 101 and "safe" computing devices 102 may be further subjected to additional verification means as provided by access control module 270 prior to allowing data communication between computing devices (e.g. 101 and 102). In one embodiment, access list 291 further defines specific services that computing device 101 is permitted to access on computing device 102 (or vice versa). Accordingly, access control module 270 may limit communication and transfer of information to those permitted services for computing device 102. In another embodiment, access control module 270 can determine that computing device 102 is a "safe" computing device as it is listed on access list 291 of computing device 101. Additionally, access control module 270 can be configured to request at least one pre-defined password or other authorization means prior to allowing exchange of data between computing devices 101 and 102. That is, access control module 270 can be configured to cause computing device 101 to operate in a limited communication mode that allows the exchange of password and/or authorization means between computing device 101 and a "safe" computing device (e.g. 102) but prevents data communication between computing device 101 and 102 until computing device 102 has provided the pre-defined authorization means. In yet another embodiment, safe computing device 102 may contain a second access list (not shown) stored on a memory thereon such that access control module 270 may monitor connection/pairing in dependence upon the existence of first computing device 101 on the second access list.

As will be understood by a person skilled in the art, the connection and/or pairing requests may be initiated on either first computing device 101 and/or computing device 102. In yet another embodiment, access control module 270 may be located on an external device communicating with access list 291 such that computing device 101 may need to obtain authorization from the external device (via access control module 270) prior to establishing connection with computing device 102.

Additionally, in one embodiment, at least some of the functionality of configuration module 260 may be offloaded to a different device of the plurality of computing devices (e.g. 102, 103). For example, in the scenario where configuration of access list 291 occurs on one computing device and then the same access list 291 may be installed or otherwise shared with another computing device (e.g. 101) then computing device 101 may not need to have the functionality to configure and modify access lists 291.

As further illustrated in FIG. 2, the Bluetooth manager 300 further comprises a pairing and/or connection module 280 which may comprise any combination of software, firmware and hardware. Typically, in Bluetooth communications two devices should be paired in order to communicate with one another. The pairing process can be triggered automatically or user-initiated the first time a Bluetooth enabled device receives a connection request from a Bluetooth enabled device with which it is not yet paired. Once pairing has been established, the pairing is remembered by the Bluetooth enabled devices, which can then connect to each other without user intervention. In addition, a pairing can be removed by a user at any time. According to one embodiment, pairing module 280 communicates with access control module 270. In this embodiment, a pairing may be automatically removed if the computing device being paired to is not present on access list 291. Similarly, access control module 270 may prevent a new pairing to be added if the computing device being paired to is not on access list 291. In this manner Bluetooth manager 300 controls communications between first computing device 101 and other computing devices.

The remote database communicative coupled to computing device 101 may be accessed, and used to update computing device 101 via the GUI of computing device 101. It will be appreciated by one of ordinary skill in the art that computing device 101 may contain additional functions/elements/mechanisms other than those illustrated in FIG. 2.

Figure 3:
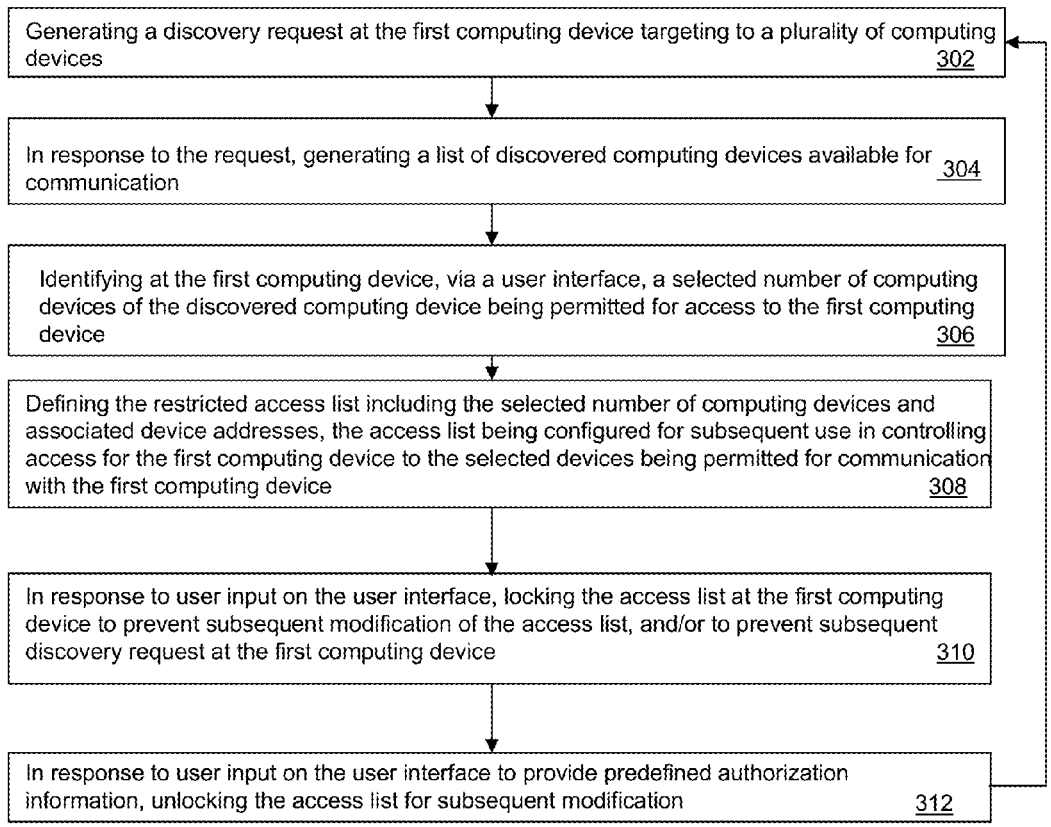
FIG. 3 is an illustrative flowchart showing process steps of a method in accordance with one embodiment of the present invention for configuring or reconfiguring an access list on the first computing device of FIG. 1.

FIG. 3 illustrates process steps involved in one embodiment of the present invention for configuring or provisioning an access list 291 on a first computing device 101 for defining communication and connection between first computing device 101 and a plurality of other computer devices (e.g. 102, 103) accessible in a Bluetooth communication local network.

At step 302, a discovery request is generated at computing device 101 such that the discovery request is targeted to at least one of the plurality of computing devices 102, 103 in a Bluetooth communication network. An example Bluetooth communication network is illustrated in FIG. 1.

At step 304, in response to the discovery request, a list of discovered computing devices available for communication (e.g. devices 102, 103) is generated at computing device 101. The generated list may be displayed on display 222 of computing device 101 for subsequent interaction therewith via a graphical user interface. In response to the discovery request, informational elements associated with each of the discovered computing devices may also be received. The informational elements may be used for unique identification of the associated computing devices within access list 291. The informational elements also referred to as device identifiers may include one or more of the following: a serial number, a device model number, an IP address, a Bluetooth address (e.g. a 48-bit Bluetooth address), a terminal name, services offered by the device and any other information for establishing communication between computing device 101 and the discovered computing device (e.g. 102, 103).

At steps 306 and 308, one or more of the discovered computing devices may be assigned to access list 291 as being permitted to access first computing device 101. That is, once the discovered computing devices 102, 103 respond to the discovery request and communicate their information such as informational elements (also referred to as device identifiers) discussed herein, the informational elements (e.g. device address or Bluetooth address) can be added into access list 291 via configuration module 260 of first computing device 101, or in the remote database. In the example portrayed in FIG. 1, from the discovered available computing devices 102 and 103, a selected number of computing devices (e.g. devices 102) are assigned to access list 291. As discussed above, access list 291 is then used (i.e. by access control module 270) to restrict or limit access for first computing device 101 to the selected computing devices (e.g. computing devices 102) being permitted to communicate with the first computing device 101, while preventing communication access between first computing device 101 and other computing devices not listed on access list 291 of computing device 101.

In another variation, it is contemplated that, at the graphical user interface (GUI) display of first computing device 101, one or more computing devices of the plurality of computing devices may be automatically added to access list 291 according to pre-defined criteria and that access list 291 may be modified by the operator or administrator.

At step 310 and in accordance with one embodiment, in response to user input received on the graphical user interface of first computing device 101, a restricted access mode of operation is initiated on first computing device 101. That is, in the restricted access mode, the user/administrator of first computing device 101 defines that no further modifications are to be made to access list 291 without pre-defined authorization measures (i.e. password) such that access list 291 may be locked to prevent subsequent modification. Additionally, the restricted mode of operation may also include preventing subsequent discovery requests being generated with first computing device 101.

At step 312, and in response to pre-defined user input received on the graphical user interface of first computing device 101 which provides pre-defined authorization information associated with access list 291, access list 291 may be unlocked for subsequent access and modification. In this variation, the restricted mode may be exited and additional devices discovered once unlocked.

Figure 4:
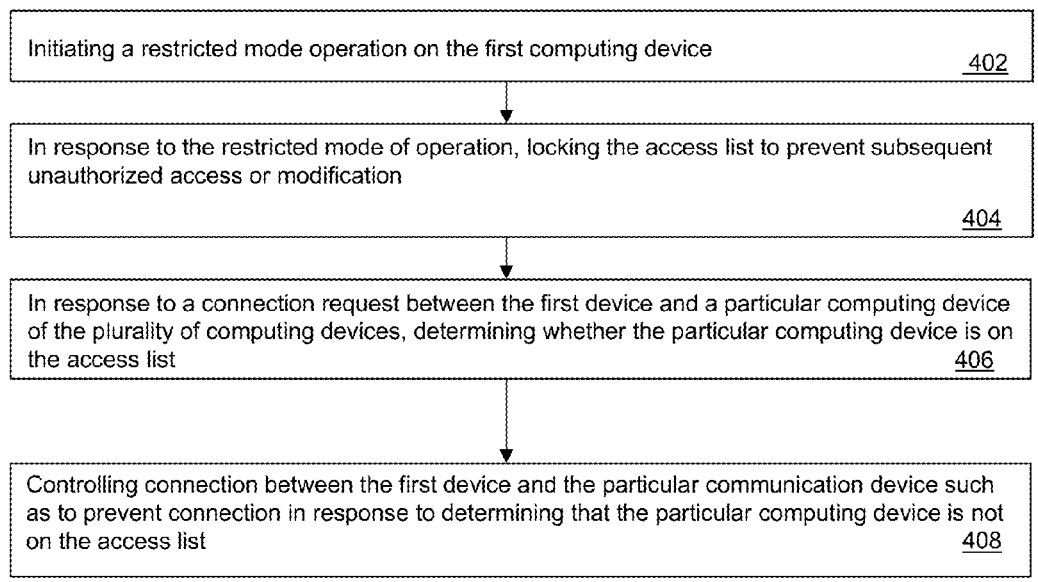
FIG. 4 is an illustrative flowchart showing process steps of a method in accordance with one embodiment of the present invention for restricting access between the first computing device and a plurality of other computing devices in a Bluetooth network based on a defined access list on the first computing device of FIG. 1.

FIG. 4 illustrates a process for using a restricted access list 291 stored on memory 290 of the first computing device 101 in accordance with an embodiment. As discussed earlier, access list 291 provides a list of a selected number of devices permitted to access (or communicate with) first computing device 101. Access list 291 defines communication between first computing device 101 and a plurality of computing devices (e.g. 102, 103) in a Bluetooth communication local network. As discussed earlier, the access list 291 may be defined locally on the first computing device 101 or defined on an external device (e.g. device 102) and later downloaded onto computing device 101. The configuration of the access list 291 may be downloaded onto the computing device 101 via the communication subsystem 211, auxiliary I/O subsystem 228, serial port 230, USB port 242, short-range communications subsystem 240, or any other suitable subsystem, for execution by microprocessor 238.

Access list 291 may be communicated in conjunction with an authorization password for authorizing changes to access list 291. As will be described, installation of external access list 291 will be prevented on a computing device by configuration module 260 if the computing device is operating in a restricted mode of operation. Additionally, in one aspect, the configuration module 260 can allow user input to determine how a newly added access list and its corresponding entries are to be integrated with a currently loaded access list 291 considering the computing device is not operating in a restricted mode of operation.

At step 402, a restricted mode of operation is initiated on first computing device 101 such that the restricted mode of operation is configured to secure access list 291 and prevent subsequent pre-defined unauthorized access or modification thereof at step 404. That is, once the restricted mode of operation is initiated, configuration module 260 prevents any modification to access list 291 currently in use. Furthermore, in one aspect, while the restricted mode of operation is active, configuration module 260 prevents the installation and/or use of any additional access lists other than the one that was on the computing device 101 when initiating restricted mode of operation. At step 406, in response to a connection request between first computing device 101 and a particular computing device (e.g. computing device 103), it is determined whether the particular computing device (e.g. 103) is on access list 291 of first computing device 101. If not, then first computing device 101 prevents communication access between first computing device 101 and the particular computing device (e.g. 103). That is, at step 408, the connection between first computing device 101 and the particular computing device (e.g. 103) is controlled in response to the existence of the particular computing device (e.g. 103) on access list 291. For example, referring to FIG. 1, since computing device 103 is not present on access list 291, a connection/pairing between first computing device 101 and particular computing device 103 can not be made. As discussed earlier, if a Bluetooth connection has been made between device 103 and 101, then such a connection is terminated in response to initiated the restricted mode of operation.

In one variation, allowing connection between first computing device 101 and particular computing device (e.g. 103) is further related to the existence of first computing device 101 on a second access list (not shown) associated with that particular computing device (e.g. 103).

Referring to FIGS. 5A-5G there are illustrated example screen shots of a graphical user interface for configuring an access list 291 on a first computing device 101. In the example illustrated, Bluetooth manager 300 is implemented on the first computing device 101 running WindowsCE™, available from Microsoft. However, as will be understood by a person skilled in the art, other types of operating systems may be employed if desired such as but not limited to Windows Mobile™, Android™ OS, Apple iOS™, and Linux™.

Figure 5A:
FIGS. 5a-5g are screenshots illustrating a process in accordance with one embodiment of the present invention for configuring an access list on the first computing device of FIG. 1 and entering restricted mode operation on the first computing device.

Referring to FIG. 5A, shown is an icon 502 for initiating a Bluetooth Manager application on first computing device 101. The Bluetooth Manager application described in reference to FIGS. 5A-6C is an example of Bluetooth manger 300 illustrated in FIG. 2. In the example illustrated, the Bluetooth Manager application is a control panel applet of Windows CE.

Figure 5B:
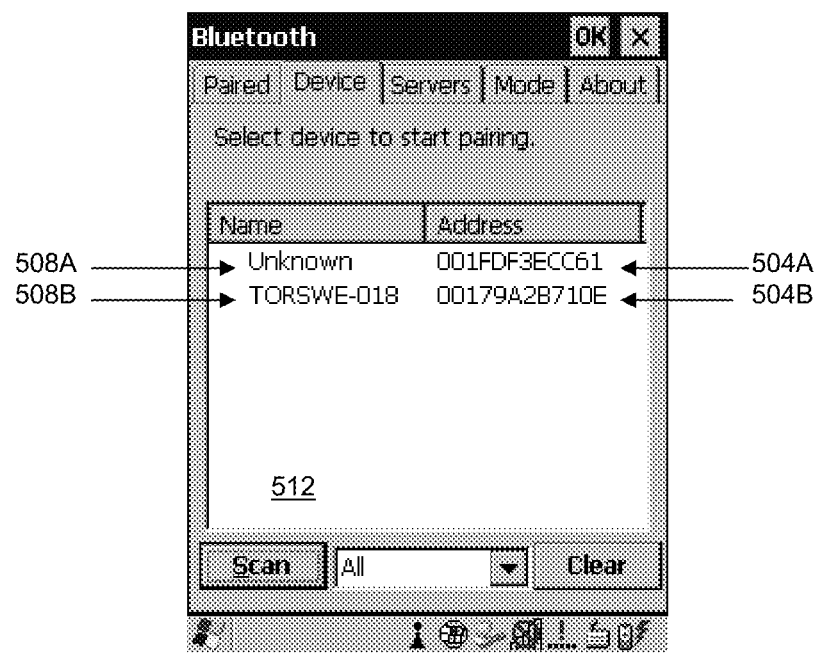

Referring to FIG. 5B, shown is a list 512 depicting discovered computing devices 508A and 508B (also referred to herein as devices available for communication) generated in response to a discovery request performed on first computing device 101. For example, the discovery request may be initiated by pressing the "SCAN" button in the "Device" tab as illustrated in FIG. 5B. In response to the discovery request, the Bluetooth addresses 504A and 504B associated with each device 508A and 508B have been determined and are displayed in list 512. It is noted that FIGS. 5A-5E show first computing device 101 in the configuration mode such that restricted mode of operation has not yet been initiated.

Figure 5C:
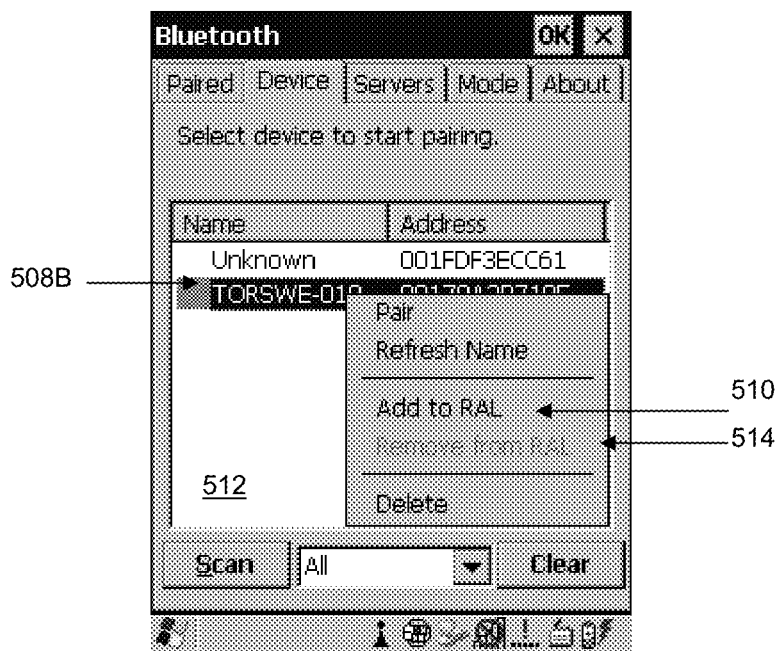
Figure 5D:
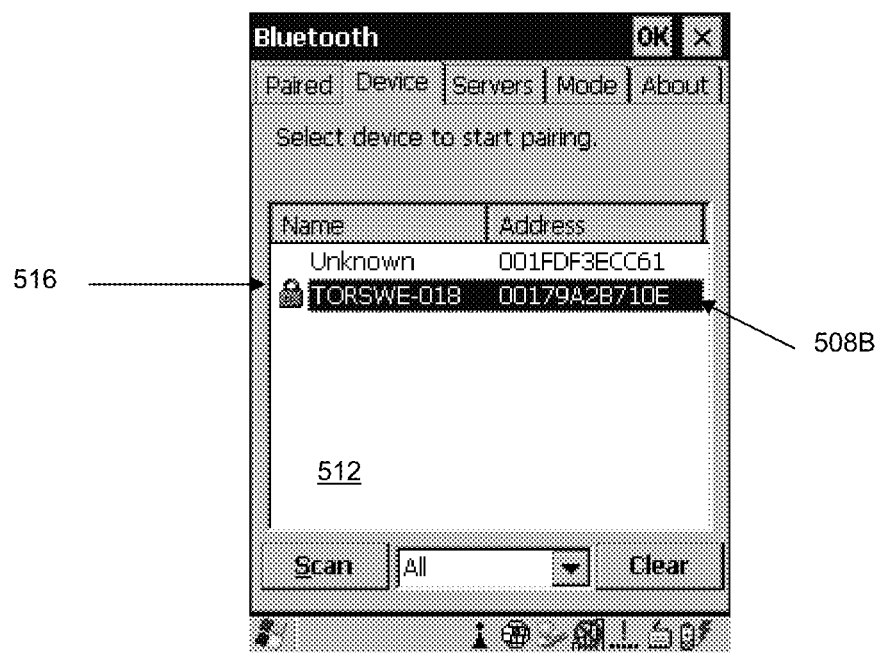

Referring to FIG. 5C, by selecting one of the discovered devices (e.g. device 508B), a device menu 514 is presented. The device menu 514 provides the options of pairing first computing device 101 to the selected device 508B, and adding the discovered device 508B to the restricted access list ("RAL"), by selecting the associated option 510. Additionally, the operator/administrator can remove a device from the restricted access list by selecting the option "Remove from RAL", as illustrated in menu 514. As discussed earlier, when the restricted mode of operation is activated on first computing device 101, only the computing devices in the restricted access list stored on the memory of first computing device 101 will be able to access first computing device 101 via Bluetooth. In FIG. 5D, device 508B is added to the restricted access list for first computing device 101 and the discovered list 512 now shows a lock icon 516 beside device 508B to visually indicate that the device 508B is in the restricted access list (e.g. access list 291). It is noted that other methods of visually differentiating selected devices added to the restricted access list may be envisaged by a person skilled in the art.

Figure 5E:
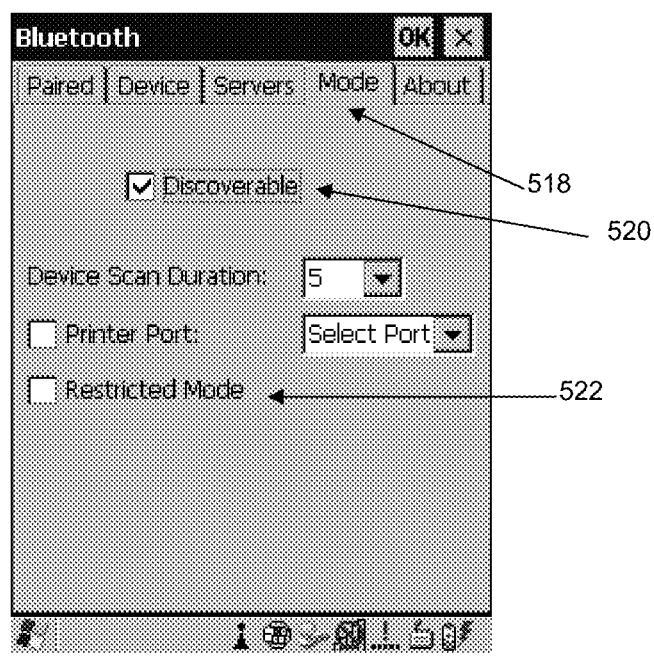

Referring to FIG. 5E, shown is the "Mode" tab 518 of first computing device 101. The "Mode" tab 518 illustrates that first computing device 101 is currently discoverable, with check box 520, and allows the selection and activation of the restricted access mode, with check box 522.

Figure 5F:
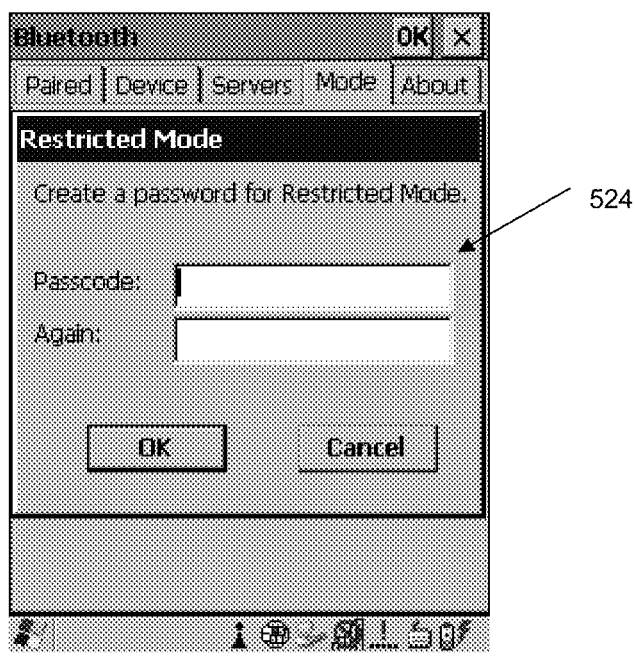
Figure 5G:
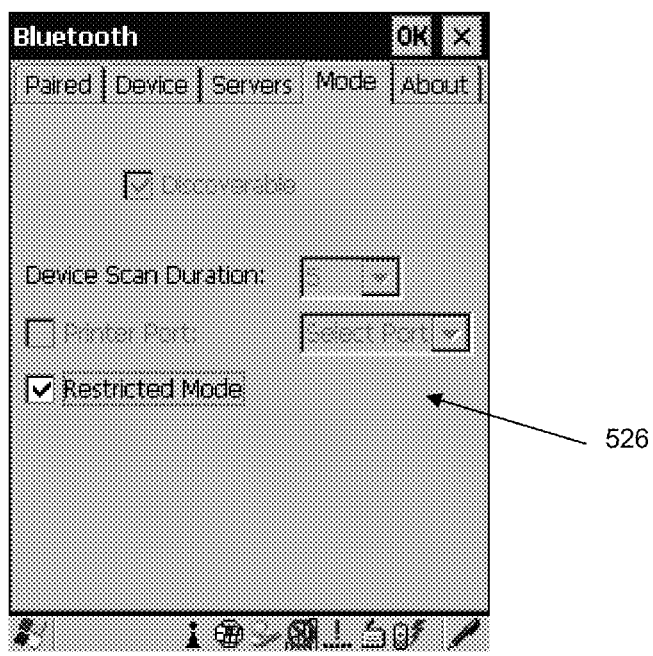

As shown in FIG. 5F, once the restricted access mode is selected, a password is requested in screen 524. The Bluetooth Manager is configured to remember the password such that if the user wishes to exit the restricted mode of operation, the password will need to be provided. In one aspect, the password is stored on a memory of first computing device 101 in encrypted form. In FIG. 5F, once the password is entered twice (for confirmation purposes) at screen 524, first computing device 101 will be in restricted mode of operation. Accordingly, only remote device whose addresses (e.g. Bluetooth address) and/or other identification measures have been provided in the restricted access list will be able to access first computing device 101 once first computing device 101 enters the restricted mode of operation. Accordingly, as discussed earlier, if a different computing device (e.g. device 508A) attempts to access first computing device 101 while operating in restricted mode of operation, access control module 270 will prevent or inhibit the connection. As described earlier, if a Bluetooth connection was made between first computing device 101 and computing device 508A prior to entering the restricted mode of operation, then such connection is terminated and further communication inhibited once computing device 101 enter restricted mode of operation. An example selection of restricted mode of operation on computing device 101 is shown in FIG. 5G and screen shot 526.

Figure 6A:
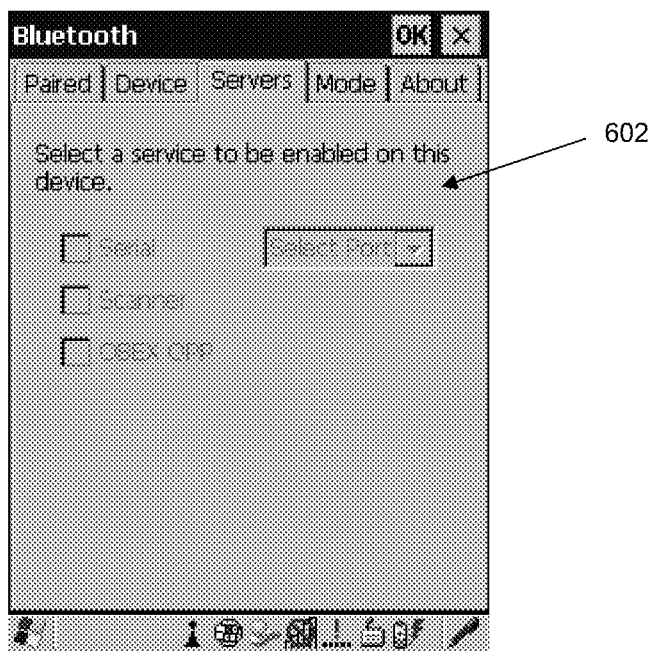
FIGS. 6a-6c are screenshots illustrating the operation of the first computing device in the restricted mode of operation in accordance with the present invention.

Referring now to FIG. 6A, there is a "Servers" tab for the Bluetooth Manager where users can activate Bluetooth services shown at screen 602 offered by computing device 101 for remote devices within the Bluetooth communication network. However, as the computing device 101 is now in restricted mode of operation, the services controls are all ghosted or greyed out so that users won't be able to add or remove services. Accordingly, the locking mechanism triggered by the restricted mode of operation provides added security such that unauthorized users are not able to add or remove services. It is further noted that even if the services were not blocked as illustrated in screen shot 602, the computing devices not listed in the restricted access list are not able to access, or be accessed by, first computing device 101.

Figure 6B:
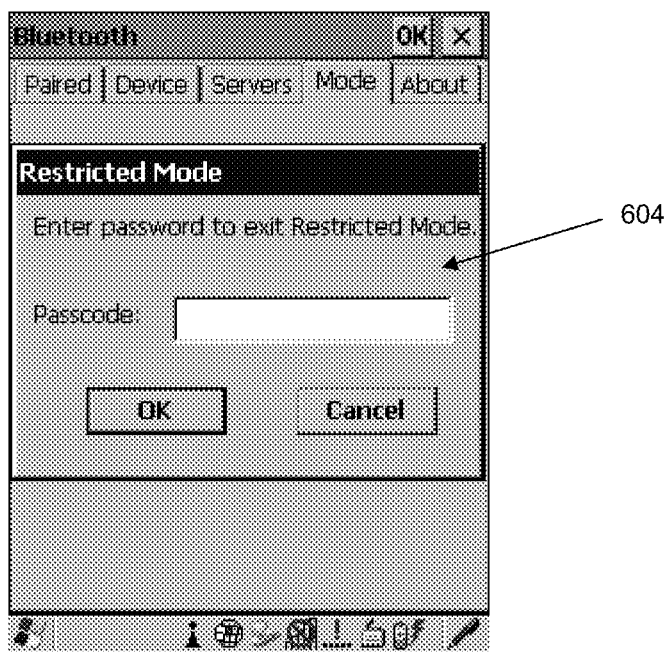
Figure 6C:
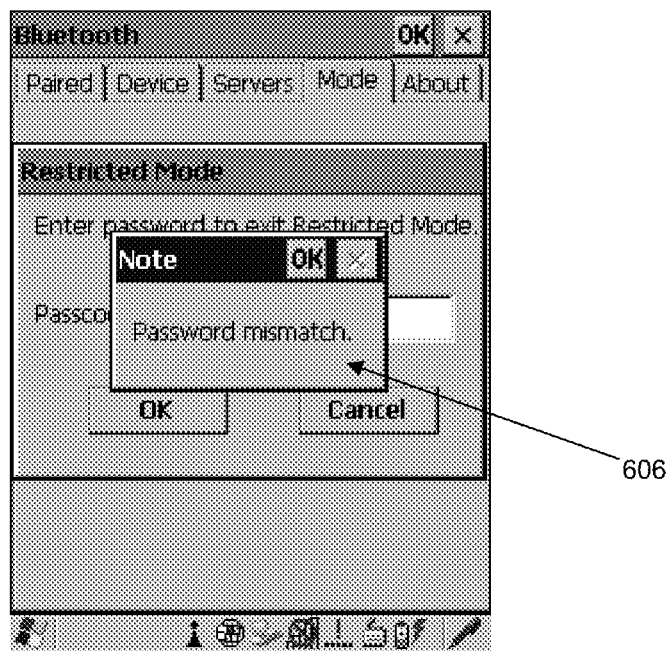

Referring now to FIG. 6B, the user can exit the restricted mode by unselecting "restricted mode" in the "mode" tab. However, when the user attempts to exit the restricted mode of operation, the Bluetooth manager will request the authorization information (e.g. password). As illustrated in FIG. 6C and screen shot 606, if the password is not authorized, the restricted access mode remains in force.

It is noted that the disclosure herein has been described with reference to specific embodiments; however, varying modifications thereof will be apparent to those skilled in the art without departing from the scope of the invention as defined by the appended claims.

The invention claimed is:

1. A method of using an access list stored on a memory of a first computing device, the access list for controlling communication between the first computing device and a plurality of computing devices in a Bluetooth communication network, the method comprising:
    initiating a discovery request at the first computing device such that the discovery request is targeted to at least one of the plurality of computing devices;
    generating a list of discoverable computing devices from the plurality of computing devices available for communication with the first computing device in response to the discovery request;
    pairing the first computing device to a discovered computing device;
    assigning the discovered computing device to the access list;
    initiating a restricted mode of operation on the first computing device, the restricted mode of operation configured to secure the access list to prevent subsequent unauthorized modification thereof, the access list including an entry representing the discovered computing device of the plurality of computing devices that is permitted to access the first computing device, the entry comprising at least one identifier to identify the discovered computing device;
    in response to a connection request between the first computing device and a particular computing device of the plurality of computing devices, determining whether the particular computing device is on the access list; and
    preventing connection between the first computing device and the particular computing device in response to determining that the particular computing device is not on the access list.

2. The method of claim 1, further comprising preventing subsequent discovery requests from the first computing device in response to initiating the restricted mode of operation.

3. The method of claim 1, wherein the at least one identifier is selected from the group consisting of: IP address, MAC address, serial number, and Bluetooth address.

4. The method of claim 1, wherein the access list is defined on the first computing device via a user interface.

5. The method of claim 1, wherein the access list is provided to the first computing device from a second computing device.

6. The method of claim 1, wherein, upon initiating the restricted mode of operation, preventing connection further comprises terminating an existing connection between the first computing device and the particular computing device when the particular computing device is not on the access list.

7. The method of claim 1, wherein preventing connection between the first computing device and the particular computing device is further in response to determining that the first computing device is not on a second access list associated with the particular computing device.

8. The method of claim 1, wherein a connection request is initiated on the first computing device.

9. The method of claim 1, wherein a connection request is initiated on the particular computing device.

10. The method of claim 1, wherein the restricted mode of operation is controlled via a password stored on the memory of the first computing device.

11. The method of claim 1, further comprising disabling modification of preselected services provided by the first computing device to the discovered computing device in response to the initiated restricted mode of operation.

12. The method of claim 5, further comprising defining the access list on the second computing device by receiving user input providing the at least one identifier to identify the discovered computing device for the at least one entry.

13. The method of claim 12, wherein the at least one identifier is selected from the group consisting of: IP address, MAC address, serial number, and Bluetooth address.

14. The method of claim 13, wherein the second computing device is a non-Bluetooth device.

15. A first computing device comprising:
a processor;
a memory coupled to the processor, the memory configured to store an access list for controlling communication between the first computing device and a plurality of computing devices in a Bluetooth communication network, the memory coupled to the processor having instructions stored thereon for execution by the processor, the memory comprising instructions for:
initiating a discovery request at the first computing device such that the discovery request is targeted to at least one of the plurality of computing devices;
generating a list of discoverable computing devices from the plurality of computing devices available for communication with the first computing device in response to the discovery request;
pairing the first computing device to a discovered computing device;
assigning the discovered computing device to the access list;
initiating a restricted mode of operation on the first computing device, the restricted mode of operation configured to secure the access list to prevent subsequent unauthorized modification thereof, the access list including an entry representing the discovered computing device of the plurality of computing devices that is permitted to access the first computing device, the entry comprising at least one identifier to identify the discovered computing device;
in response to a connection request between the first computing device and a particular computing device of the plurality of computing devices, determining whether the particular computing device is on the access list; and
preventing connection between the first computing device to the particular computing device in response to determining that the particular computing device is not on the access list.

16. The computing device of claim 15, wherein the memory further comprises instruction for: preventing subsequent discovery requests from the first computing device in response to initiating the restricted mode of operation.

17. The computing device of claim 15, wherein the at least one identifier is selected from the group consisting of: IP address, MAC address, serial number, and Bluetooth address.

18. The computing device of claim 15, further comprising a user interface for defining the access list.

19. The computing device of claim 15, wherein the memory further comprises instructions for terminating an existing connection between the first computing device and the particular computing device when the particular computing device is not on the access list during the restricted mode of operation.

20. The computing device of claim 15, wherein the memory comprises instructions for preventing connection between the first computing device and the particular computing device is further in response to determining that the first computing device is not on a second access list associated with the particular computing device.

* * * * *